United States Patent [19]

Lagergren et al.

[11] Patent Number: 4,921,150
[45] Date of Patent: May 1, 1990

[54] AUTOMATIC DISPENSING APPARATUS HAVING LOW POWER CONSUMPTION

[75] Inventors: Peter J. Lagergren, Arlington; Lacy C. Lance, Fort Worth; C. Cameron Allen, Jr., Richardson, all of Tex.

[73] Assignee: Pandel Instruments, Inc., Grand Prairie, Tex.

[21] Appl. No.: 236,948

[22] Filed: Aug. 26, 1988

[51] Int. Cl.$^5$ .............................................. B67D 5/08
[52] U.S. Cl. .................................. 222/639; 222/214; 141/360; 137/624.11
[58] Field of Search ................. 222/52, 333, 639, 638, 222/640, 641, 643, 209, 214, 207; 137/624.11; 141/360, 361, 351

[56] References Cited

U.S. PATENT DOCUMENTS

| | | | |
|---|---|---|---|
| 3,273,752 | 9/1966 | Horeczky | 222/639 |
| 3,327,901 | 6/1967 | Yerkovich | 222/639 |
| 3,384,080 | 5/1968 | Muller | 222/214 |
| 3,531,021 | 9/1970 | Bassett | 222/214 |
| 4,135,647 | 1/1979 | Mascia et al. | 222/214 |
| 4,414,982 | 11/1983 | Durkan | 137/624.11 |

Primary Examiner—H. Grant Skaggs
Assistant Examiner—Kenneth Noland
Attorney, Agent, or Firm—David H. Judson

[57] ABSTRACT

An apparatus for automatically dispensing flowable material from a disposable container includes a novel electronic control circuit for providing improved and more efficient operation over prior art devices. The electronic control circuit includes a photoelectric emitter, and a phototransistor detector adapted to receive energy reflected from a target such as a user's hands. The control circuit includes a first timing circuit for periodically activating the detector for a predetermined first time period equal to approximately one percent (1%) of the period between operating cycles of the detector. The control circuit also includes a second timing circuit, triggered by the first timing circuit, for activating the emitter during a latter portion of the first time period during which the detector is activated to thereby enable the detector to stabilize after power up. The emitter generates a high energy pulse having a predetermined duty cycle preferably at least one order of magnitude less than the duty cycle of the detector. The electronic control circuit further includes a detector circuit, responsive to sensing of electromagnetic radiation reflected from the target to generate an actuation signal. The detector circuit is designed to be sensitive only to a short duration pulse signal which would be reflected if the user's hands are properly positioned to activate the dispenser. The control circuit also includes a third timing circuit responsive to the actuation signal for activating a pump. This operation actuates the release of a predetermined amount of material from the disposable container.

16 Claims, 4 Drawing Sheets

FIRST TIMER OUTPUT 66

2ND TIMER OUTPUT 68

FIRST TIMER OUTPUT 80

2ND TIMER OUTPUT 82

FIRST TIMER OUTPUT 94

2ND TIMER OUTPUT 96

DETECT OUTPUT 90

AUTOMATIC DISPENSING APPARATUS HAVING LOW POWER CONSUMPTION

TECHNICAL FIELD

The present invention relates generally to dispensing and more particularly to improved electronic control circuitry for use in controlling an apparatus for dispensing metered dosages of flowable material.

BACKGROUND OF THE INVENTION

Devices for automatically delivering small predetermined quantities of liquid soap or the like onto the hands of a user without requiring manual operation thereof or any physical contact therewith are known in the prior art. Such devices typically include a container for supporting the soap, a mechanical actuator for dispensing the soap from the container, and electrical control means for controlling the operation of the mechanical actuator. One such device is shown in U.S. Pat. No. 3,327,901 to Yerkovich. The electrical control means in the Yerkovich patent includes an a.c.-powered incandescent lamp which cooperates with a photoconductor cell. As long as a light beam between these elements remains uninterrupted, the mechanical actuator is deenergized. Once the beam is interrupted by the user's hands, however, the circuit activates the mechanical actuator to dispense the soap.

More recently, attempts have been made to provide improvements to the Yerkovich-type dispenser by incorporating battery-operated electronic control circuitry into the device. One such device is described in U.S. Pat. No. 4,722,372 to Hoffman et al. In particular, the Hoffman et al. patent discloses an automatic soap dispenser which includes a proximity sensor to detect the approach of a user. The proximity sensor is designed to activate a normally-inactive photocell sensing system which in turn establishes a pulsed trigger signal between a light emitting diode and a phototransistor. As in other art "thru-scan" techniques, the interruption of the trigger signal by the user's hands controls the actuation of a mechanical actuator for dispensing the soap. The Hoffman et al. patent also describes a disposable soap container which includes a built-in battery pack for energizing the dispenser.

While the Hoffman et al dispenser provides advantages over earlier designs by requiring only selective activation of the photocell sensing system, this device still requires a continuous supply of power to the proximity sensor to provide proper operation of the device. The proximity sensor circuitry causes a continuous drain on the battery supply, and this power drain is exacerbated when the photocell sensing system is activated to produce the pulsed trigger signal. The battery power drain reduces the effective life of the built-in battery pack disposable container, thus increasing the cost of maintaining the device.

It is also known in the prior art to provide a proximity detector which uses an a.c. signal-modulated trigger waveform to minimize the effects of ambient light on the photocell sensing system. These systems typically require the use of a sharply tuned filter to separate the modulating signal from the background noise. Such modulation schemes are therefore incompatible with a battery-powered dispenser because of the continuous power requirements of the emitter and detector circuitry.

Other prior art fluid dispensing devices include sophisticated electronic circuitry for receiving a composite signal including both pulsed infrared light and ambient light and then biasing out the ambient light and passing only the infrared pulses to a processing circuit. This approach is disclosed in European Patent Application No. 0,078,181 assigned to Calgon Corporation. European Patent Application No. 0,127,497, also assigned to Calgon Corporation, discloses a similar device which includes additional circuitry that shuts down the dispenser electronics when the room is dark. While these devices have proven satisfactory, the electronic circuitry therein is complex and therefore expensive.

It would therefore be desirable to provide an improved electronic control means for use in an automatic material dispenser of the type generally described above which exhibits low average power drain yet provides significant immunity to background noise.

BRIEF SUMMARY OF THE INVENTION

It is an object of the present invention to provide an improved electronic control circuit for use in controlling an automatic flowable material dispenser.

It is yet another object of the present invention to provide a battery-powered dispensing apparatus having significantly lower energy requirements and improved immunity to background noise as compared to prior art devices.

It is yet a further object of the invention to provide an efficient electrically-operated automatic dispensing apparatus which uses an in-line peristaltic pump for dispensing metered dosages of soap from the device.

It is still another object of this invention to describe an apparatus for dispensing flowable material using a disposable container which is cheaper to manufacture and maintain as compared to prior art devices.

It is another object of the invention to provide a dispensing apparatus which uses "diffuse" infrared scanning as opposed to a thru-scan technique to trigger the dispensing mechanism.

These and other objects of the invention are provided in a low-power, electrically-operated dispensing apparatus for automatically delivering small predetermined quantities of liquid soap or the like onto the hands of a user without requiring manual operation thereof or any physical contact therewith. In the preferred embodiment, the apparatus comprises a disposable container for holding flowable material to be dispensed, releasing means normally integrated with the container for releasing a predetermined amount of flowable material from the disposable container when the releasing means is actuated, actuating means when electrically-energized for actuating the releasing means to release the predetermined amount of material, and electronic control means for controlling the actuating means to actuate the releasing means for releasing the material.

According to the invention, the electronic control means provides for improved and more efficient operation over prior art devices. The electronic control means includes a photoelectric means comprising an emitter, and a detector adapted to receive energy reflected from a target such as a user's hands. The control means further advantageously includes first timing means for periodically activating the detector for a predetermined first time period. The predetermined first time period is preferably approximately one percent (1%) of the period between operating cycles of the detector to reduce the power requirements of the circuit. The control means also includes second timing means, triggered by the first timing means, for activating the emitter during a predetermined portion of the first time period when the detector is activated. The emitter generates a single high-energy pulse having a duty cycle at least one order of magnitude less than the duty cycle of the detector. The electronic control circuit further includes a detector circuit which is responsive to sensing of electromagnetic radiation reflected from the target to generate an actuation signal. The detector circuit is sensitive only to the type of short duration pulse which would be reflected if the user's hands are properly positioned to activate the dispenser. Normal background noise, however, is ignored by the detector circuit. The control means also includes third timing means responsive to the actuation signal for activating the actuating means. This operation actuates the releasing means to release the predetermined amount of material from the disposable container.

Preferably, the releasing means includes a length of flexible-walled tubing connected at one end portion thereof to the interior of the disposable container. The other end portion of the tubing has an opening therein for supporting a check valve. The flexible-walled tubing is adapted to be supported in-line in the actuating means. In particular, the actuating means includes a peristaltic pump means for compressively engaging a sidewall of the tubing, and motor means responsive to the actuation signal for activating the pump means.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
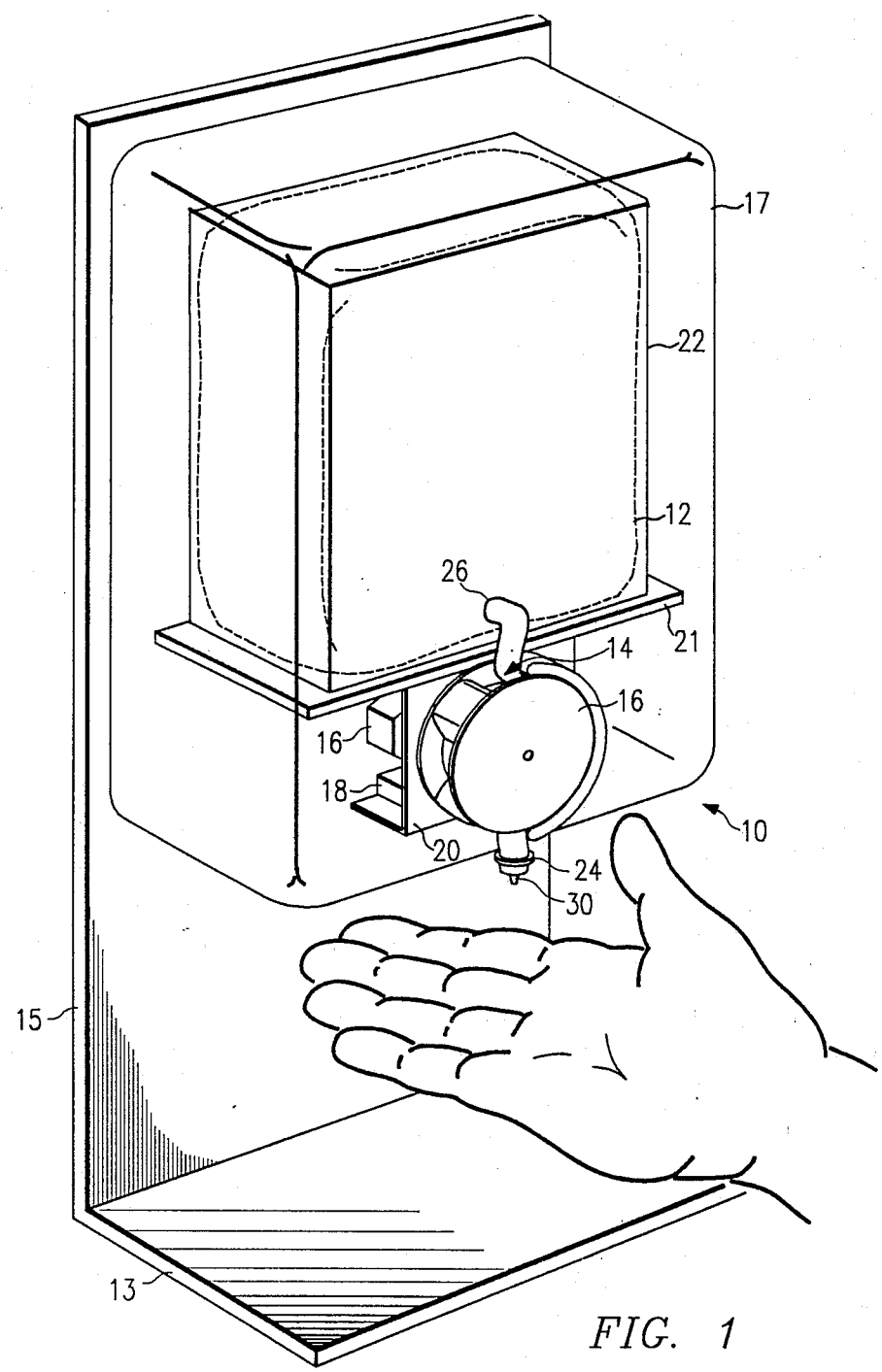
FIG. 1 is a perspective view, partially cutaway, of a preferred automatic dispensing apparatus of the present invention having an in-line peristaltic pump for use in dispensing metered dosages of flowable material such as liquid soap or detergent.

As described above, FIG. 1 is a perspective view, partially cutaway, of a preferred automatic dispensing apparatus 10 of the present invention for use in dispensing metered dosages of flowable material such as liquid soap or the like. Of course, it should be appreciated that the use of the dispensing apparatus 10 for dispensing soap is merely exemplary and that the apparatus can be used to dispense any flowable material such as food, food additives, shampoo, lotion, lubricants, chemicals, or the like. In the preferred embodiment of the invention, the dispensing apparatus 10 preferably includes a disposable container 12 for holding flowable material to be dispensed, releasing means 14 normally integrated with the container 12 for releasing a predetermined amount of flowable material from the disposable container 12 when the releasing means 14 is actuated, actuating means 16 when electrically-energized for actuating the releasing means 14 to release the predetermined amount of material, and electronic control means 18 for controlling the actuating means 16 to actuate the releasing means 14 for releasing the material. As shown in FIG. 1, the apparatus 10 includes a suitable housing 11 including a base 13, a rear wall support 15, a container support 17 and a removable cover (not shown). Alternatively, the apparatus 10 can be directly mounted to a wall or other suitable support. The container support 17 includes a mounting plate 20 for supporting both the actuating means 16 and the electronic control means 18 as will be described. A mounting plate 21 is used to support the disposable container 12.

In the preferred embodiment of the invention, the disposable container 12 is of the type generally described in U.S. Pat. No. 4,381,846 to Heck and comprises a flexible reservoir 22 shown in phantom for supporting the flowable material, a length of flexible-walled tubing 24 connected at one end portion 26 thereof to the interior of the flexible reservoir 22. The other end portion 28 of the tubing 24 has an opening therein for supporting a check valve 30 for selectively dispensing the material stored in the reservoir. The flexible tubing is preferably formed of soft latex rubber. Alternatively, the apparatus 10 can support a reservoir into which the flowable material is poured and then dispensed through an in-line tubing. In yet another embodiment, the mounting plate 21 can simply support a flexible plastic container having a length of flexible-walled tubing connected thereto.

Figure 2:
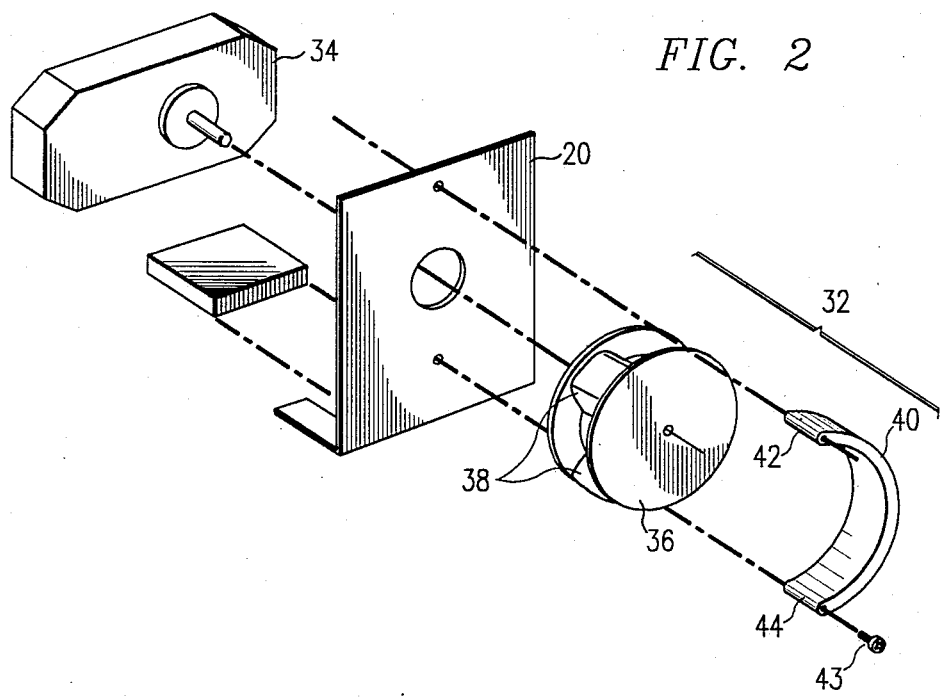
FIG. 2 is an exploded view of the motor and pump actuating assembly of the dispensing apparatus of FIG. 1.

Referring now to FIG. 2, the actuating means 16 preferably comprises two major components: a rotary type peristaltic pump 32 and a d.c. gear motor 34. Although not meant to be limiting, preferably the peristaltic pump 32 is formed of injection molded plastic. The pump includes a rotor 36 having a plurality of pressure rollers 38 disposed in equi-spaced relationship about its circumference. A substantially semicircular pressure plate 40, having a working surface substantially corresponding in shape to the circumference of the pump rotor 36, is positioned to bring the flexible tubing 24 into compressive engagement with a portion of the pressure rollers 38. In operation, as the rotor 36 is rotated clockwise by the gear motor 34, the pressure rollers 38 force the flowable material within the tubing through the check valve 30.

Figure 2A:
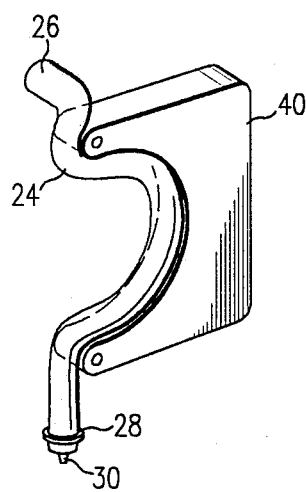
FIG. 2A is a perspective view of an alternate embodiment of FIG. 2 wherein the flexible tubing is integrally-formed with the pressure plate of the peristaltic pump.

To insure simple yet efficient installation of the disposable container in the dispensing apparatus, the pressure plate of the peristaltic pump 32 is removably secured at its first and second ends 42 and 44 to the mounting plate 20. The disposable container 12 is installed by removing a screw 43 which secures the first end 42 of the pressure plate 40 and then pivoting the plate 40 about the second end 44 thereof. The flexible tubing 24 is then supported in-line against the pressure rollers 38 and the first end 42 of the pressure plate 40 is again secured to the mounting plate 20. As also shown in FIG. 2, the motor is secured to the mounting plate 20 for easy servicing or replacement if necessary. The motor preferably is a small d.c. gear motor which runs off 6 volts d.c. at approximately 250 mA maximum torque. Alternatively, the pressure plate 40 is plastic and is integrally formed with or glued to the flexible tubing 24 and disposable therewith. In this embodiment, as shown in FIG. 2A, the end portion 26 of the tubing 24 is adapted to be secured to a disposable soap container.

Figure 3:
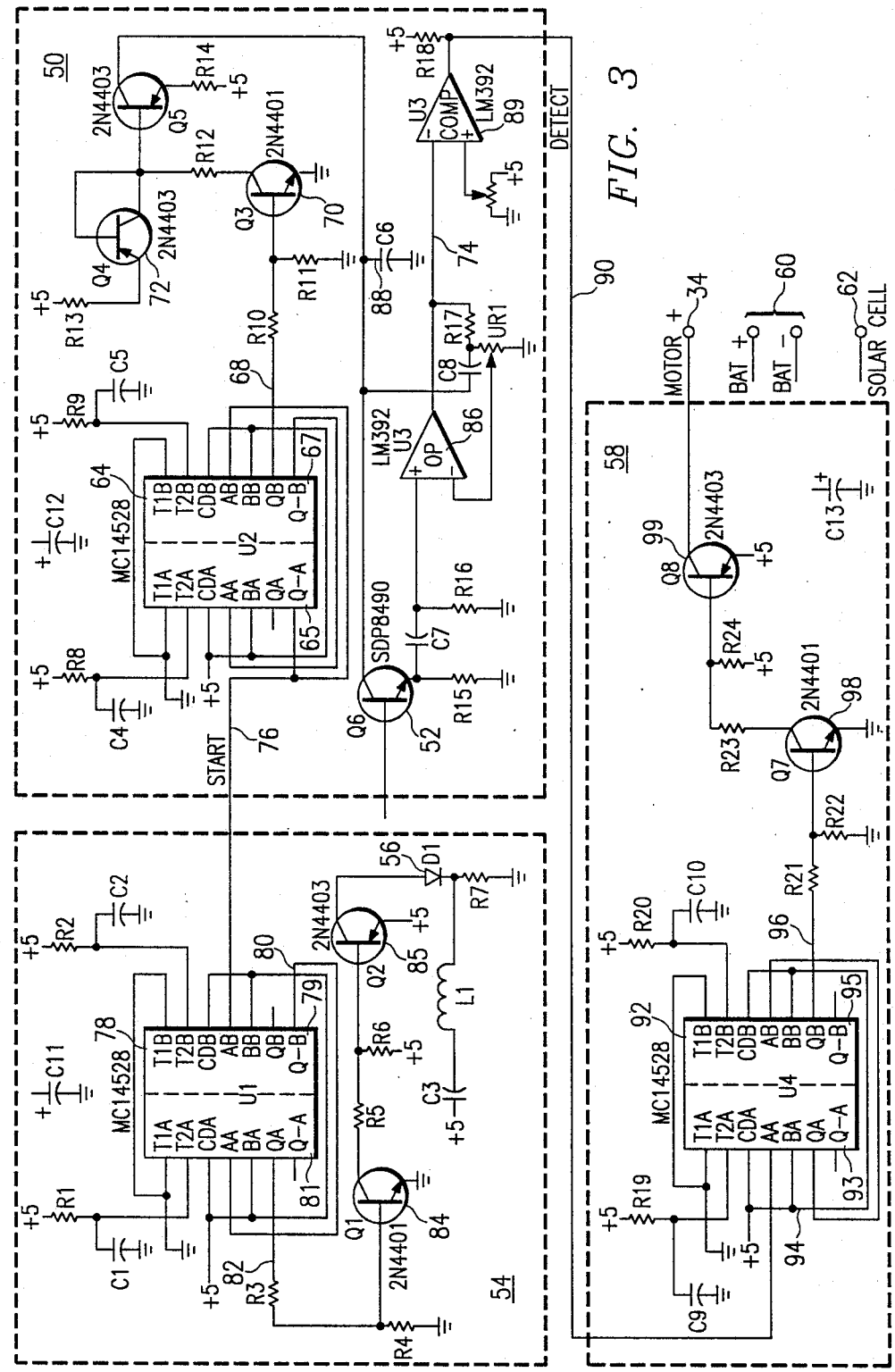
FIG. 3 is a detailed schematic diagram of the electronic control means of the dispensing apparatus according to the teachings of the invention.

Referring now to FIG. 3, the dispensing apparatus 10 preferably includes an electronic control circuit 18 having three (3) functional components: a first timing circuit 50 for controlling a phototransistor detector 52, a second timing circuit 54 triggered by the first timing circuit 50 for controlling the operation of a light emitting diode (LED) emitter 56, and a third timing circuit 58 for controlling the motor 34 and thus the peristaltic pump 32. The phototransistor 52 and the LED 56 are located substantially adjacent to each other to enable the device to be activated by reflected infrared light from a target; i.e., the user's hands. This so-called "diffuse" scanning technique provides significant advantages over prior art thru-scan techniques where the LED and the phototransistor establish a beam which must be interrupted to activate the device. While the diffuse scanning technique of the invention is preferred, the circuitry described below may also exploit a thru-scan or retroreflective scan technique. The electronic control circuit 18 is powered by a suitable battery supply 60 which may be rechargeable if desired. Although not shown in detail, the apparatus 10 may alternatively be powered by an a.c./d.c. converter which plugs into a standard wall outlet and which transmits low voltage d.c. to the dispenser. In another embodiment, a solar cell 62 is used to supply current to the detector 52, thereby reducing the power requirements of the battery 60. The solar cell 62 requires sufficient indoor lighting to run the detector.

The electronic control circuit 18 provides significant operating advantages over the prior art by "flashing" the emitter 56 with a single relatively high power, low duty cycle current pulse. Moreover, the detector 52 is powered up only for a short time before the current pulse is generated and is powered down for a longer interval between current pulses. In particular, preferably the phototransistor 52 is activated every 140 msec. for an on time of 1.4 msec. In other words, the duty cycle of operation of the detector is approximately one percent (1%) of the period between operating cycles of the detector. This technique results in a battery drain of one-to-two (1-2) orders of magnitude less than prior art methods. Moreover, noise sensitivity is greatly reduced by making the detector 52 sensitive only to the type of short duration pulse which would be reflected if the user's hands are properly placed near the emitter 56. Normal background radiation, primarily that produced by 60 Hz. powered lights, is ignored. The resulting operation produces low average power drain which greatly extends the life of the battery supply 60, as well increased immunity to background noise.

Referring now simultaneously to FIGS. 3 and 4A–4F, these advantages are achieved by providing the first timing circuit 50 with a dual timing circuit 64 having a first timer 65 which generates an output on line 66 approximately every 140 msec. The output on line 66, shown in FIG. 4A, activates the second timer 67 of the dual timing circuit 64 which in turn generates an output signal pulse on line 68 for a predetermined first time period, preferably 1.4 msec. The output signal pulse on line 68, shown in FIG. 4B, activates a transistor 70 and pnp transistor 72 pair to thereby cause power to be applied to a dual device 74 and the phototransistor detector 52. As also seen in FIG. 3, the output on line 66 also triggers the second timing circuit 54 via "start" line 76.

Figure 4A:
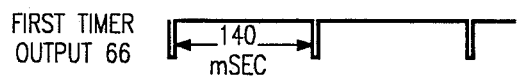
FIGS. 4A-4F are timing diagrams showing the preferred waveforms generated by the timing circuits of the electronic control means of FIG. 3.
Figure 4B:
Figure 4C:
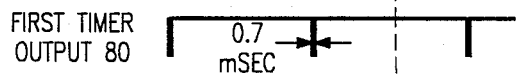
Figure 4D:

The second timing circuit 54 also includes a dual timing circuit 78. The first timer 79 of the dual timing circuit 78 is triggered by the start line 76 and generates a logic low on line 80 for approximately 0.7 msec as shown in FIG. 4C. This short time period acts as a delay to enable the phototransistor detector 52 and the dual device 74 to stabilize after power up. When the 0.7 msec. timer runs out, the output signal on line 80 goes high as shown in FIG. 4C, thereby triggering the second timer 81 of the dual timing circuit 78. The second timer 81 generates an output signal pulse on line 82 for a predetermined time period, preferably 0.032 msec, as shown in FIG. 4D. The second time period of the output signal pulse produced by the second timer 81 is therefore at least one order of magnitude smaller than the predetermined time period of the output signal produced by the second timer 67.

Figure 4E:
Figure 4F:

The 0.032 msec. signal on line 82 serves to activate transistor 84 to turn-on the emitter 56 through transistor 85. This operation generates an extremely high power, low duty cycle burst of infrared light. If any of this light is reflected back to the phototransistor detector 52 while the detector is on, it is amplified by operational amplifier 86 of the dual device 74. This amplified signal is then compared, by voltage comparator 89 of the dual device 74, to a set point voltage. If the amplified signal exceeds the set point voltage, then a "detect" or actuation signal is generated on a detect line 90. This line is connected to the third timing circuit 58. Third timing circuit 58 likewise includes a dual timing circuit 92 having first and second timers 93 and 95. The first timer 93 turns on upon receipt of the actuation signal on line 90. The first timer 93 generates an output on line 94 as shown in FIG. 4E which immediately turns on the second timer 95 for a predetermined third time period. The second timer 95 generates an output, as shown in FIG. 4F, on line 96 which controls transistor 98 to activate the motor 34 through transistor 99 for the duration of the second timer 95. The first timer 93 continues to run during the predetermined third time period and thus serves to disable the motor 34 until it times out.

Figure 4G:
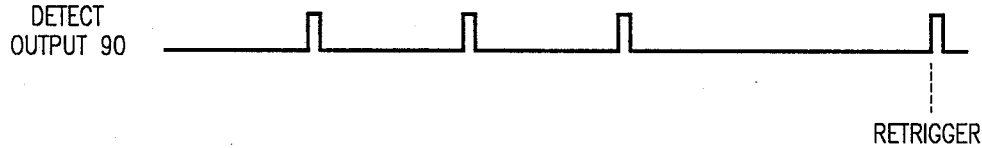
FIG. 4G is the waveform generated upon a "detect" condition.

The third timer circuit thus allows regulation of the volume pumped by the peristaltic pump 34 via the duration of the second timer 95 of the dual timing circuit 92. It also determines a delay before the motor can be started again via the duration of the first timer 93 of the dual timing circuit 92. As long as there is a "detect" as shown in FIG. 4G, then the first timer 93 of the circuit 92 continues to trigger without triggering the second timer 95 thereof. When the "detect" signal terminates, the first timer 93 times out enabling the device to be retriggered.

If desired, the electronic control circuitry in FIG. 3 may include a fourth timing means activated at the end of the period of the second timer 95 to apply an extremely short reverse voltage (through a suitable transistor means) to the motor 34. This operation prevents flowable material from dripping from the releasing means at the end of the operating cycle.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. An apparatus for dispensing flowable material comprising:
   a disposable container for holding flowable material to be dispensed;
   releasing means integrated with the container for releasing a predetermined amount of flowable material from the disposable container when the releasing means is actuated;
   actuating means when electrically-energized for actuating the releasing means to release the predetermined amount of material; and
   electronic control means for controlling the actuating means, the electronic control means comprising:
   photoelectric means comprising an emitter for emitting electromagnetic radiation, and a detector for receiving electromagnetic radiation reflected from a target;
   first timing means for periodically activating the detector for a predetermined first time period;
   second timing means triggered by the first timing means for activating the emitter during a predetermined portion of the first time period when the detector is activated to thereby generate a single, high energy pulse having a predetermined second time period, the predetermined second time period being at least one order of magnitude less than the predetermined first time period during which the detector is activated;
   wherein the second timing means includes means connected to the detector for sensing electromagnetic radiation reflected from the target and in response thereto generating an actuation signal; and
   third timing means responsive to the actuation signal for activating the actuating means for a predetermined third time period to thereby actuate the releasing means to release the predetermined amount of material.

2. The apparatus for dispensing flowable material as described in claim 1 wherein the predetermined first time period is equal to approximately one percent (1%) of a period between operating cycles of the detector.

3. The apparatus for dispensing flowable material as described in claim 1 wherein the second timing means activates the emitter during the last half of the predetermined first time period during which the detector is activated.

4. The apparatus for dispensing flowable material as described in claim 1 wherein the releasing means comprises a length of flexible-walled tubing connected at one end portion thereof to the interior of the disposable container with the other end portion of the tubing having an opening therein.

5. The apparatus for dispensing flowable material as described in claim 4 wherein the releasing means includes check valve means located at the other end portion of the tubing.

6. The apparatus for dispensing flowable material as described in claim 1 wherein the actuating means comprises:
   peristaltic pump means for compressively engaging a sidewall of the tubing; and
   motor means responsive to the actuation signal for activating the pump means.

7. The apparatus for dispensing flowable material as described in claim 6 wherein the peristaltic pump means comprises:
   a rotor having a plurality of circumferentially-spaced pressure rollers; and
   a substantially semi-circular pressure plate having a working surface substantially corresponding in shape to the circumference of the rotor, wherein the pressure plate is positioned to bring the flexible tubing into compressive engagement with a portion of the pressure rollers.

8. The apparatus as described in claim 1 wherein the first timing circuit comprises:
   a first timer having an output for generating an output signal on a periodic basis;
   a second timer having an input connected to the output of the first timer for receiving the output signal and in response thereto generating an output signal pulse having the predetermined first time period; and
   amplifier means connected to the detector for receiving the output signal pulse from the second timer and in response thereto activating the detector for the predetermined first time period.

9. The apparatus as described in claim 8 wherein the second timing means comprises:
   a first timer having an input for receiving the output signal pulse generated by the first timer of the first timing means and in response thereto generating an output signal on an output of the first timer of the second timing means; and
   a second timer having an input for receiving the output signal generated by the first timer of the second timing means and in response thereto generating an output signal pulse having the predetermined second time period; and
   amplifier means connected to the emitter for receiving the output signal pulse from the second timer of the second timing circuit and in response thereto controlling the emitter to generate the high energy pulse.

10. The apparatus as described in claim 9 wherein the third timing means comprises:
    a first timer having an input connected to the amplifier means of the first timing circuit for receiving the actuation signal and in response thereto generating an output signal on an output of the first timer of the third timing means;
    a second timer having an input for receiving the output signal generated by the first timer of the third timing means and in response thereto generating an output signal pulse; and
    amplifier means connected to the actuating means for receiving the output signal pulse generated by the second timer of the third timing means and in response thereto activating the actuating means.

11. Electronic control apparatus for controlling an actuating means, comprising:

photoelectric means comprising an emitter for emitting electromagnetic radiation, and a detector for receiving electromagnetic radiation reflected from a target;

first timing means for periodically activating the detector for a predetermined first time period;

second timing means triggered by the first timing means for activating the emitter during a predetermined portion of the first time period when the detector is activated to thereby generate a single, high energy pulse having a predetermined second time period, the predetermined second time period being at least one order of magnitude less than the predetermined first time period during which the detector is activated;

wherein the second timing means includes means connected to the detector for sensing electromagnetic radiation reflected from the target and in response thereto generating an actuation signal; and third timing means responsive to the actuation signal for activating the actuating means for a predetermined third time period.

12. The electronic control as described in claim 11 wherein the predetermined first time period is equal to approximately one percent (1%) of a period between operating cycles of the detector.

13. The electronic control apparatus as described in claim 11 wherein the second timing means activates the emitter during the last half of the predetermined first time period during which the detector is activated.

14. The electronic control apparatus as described in claim 11 wherein the first timing circuit comprises:

a first timer having an output for generating an output signal on a periodic basis;

a second timer having an input connected to the output of the first timer for receiving the output signal and in response thereto generating an output signal pulse having the predetermined first time period; and amplifier means connected to the detector for receiving the output signal pulse from the second timer and in response thereto activating the detector for the predetermined first time period.

15. The electronic control apparatus as described in claim 14 wherein the second timing means comprises:

a first timer having an input for receiving the output signal pulse generated by the first timer of the first timing means and in response thereto generating an output signal on an output of the first timer of the second timing means; and a second timer having an input for receiving the output signal generated by the first timer of the second timing means and in response thereto generating an output signal pulse having the predetermined second time period; and amplifier means connected to the emitter for receiving the output signal pulse from the second timer of the second timing circuit and in response thereto controlling the emitter to generate the high energy pulse.

16. The electronic control apparatus as described in claim 15 wherein the third timing means comprises:

a first timer having an input connected to the amplifier means of the first timing circuit for receiving the actuation signal and in response thereto generating an output signal on an output of the first timer of the third timing means;

a second timer having an input for receiving the output signal generated by the first timer of the third timing means and in response thereto generating an output signal pulse; and amplifier means connected to the actuating means for receiving the output signal pulse generated by the second timer of the third timing means and in response thereto activating the actuating means.

* * * * *